(12) United States Patent
Akao (10) Patent No.: US 7,773,241 B2
(45) Date of Patent: Aug. 10, 2010

(54) IMAGE-FORMING DEVICE

(75) Inventor: Michitoshi Akao, Yotsukaichi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1422 days.

(21) Appl. No.: 11/058,214

(22) Filed: Feb. 16, 2005

(65) Prior Publication Data

US 2005/0179933 A1 Aug. 18, 2005

(30) Foreign Application Priority Data

Feb. 17, 2004 (JP) .............................. 2004-039535

(51) Int. Cl.
G06K 15/00 (2006.01)

(52) U.S. Cl. .................... 358/1.14; 358/1.15; 358/1.16; 399/9; 399/18; 399/19

(58) Field of Classification Search ................ 358/1.14, 358/1.15, 1.16; 340/5.2, 5.8; 399/9, 18, 399/19; 380/255
See application file for complete search history.

(56) References Cited

U.S. PATENT DOCUMENTS

| 5,270,773 | A * | 12/1993 | Sklut et al. ...................... 399/20 |
| 5,752,697 | A * | 5/1998 | Mandel et al. .............. 271/288 |
| 6,633,394 | B2 * | 10/2003 | Nagasawa et al. .......... 358/1.14 |
| 6,879,410 | B1 * | 4/2005 | Tokura ....................... 358/1.14 |
| 7,230,731 | B2 * | 6/2007 | Dan et al. ................... 358/1.14 |
| 2003/0025928 | A1 * | 2/2003 | Nagasawa et al. ........... 358/1.14 |
| 2003/0103081 | A1 * | 6/2003 | Ebuchi ........................ 345/764 |
| 2003/0107756 | A1 * | 6/2003 | Dan et al. ................... 358/1.14 |
| 2004/0165209 | A1 * | 8/2004 | Aoki et al. .................. 358/1.14 |
| 2005/0100378 | A1 * | 5/2005 | Kimura et al. ................ 400/76 |

FOREIGN PATENT DOCUMENTS

| JP | A-06-022066 | 1/1994 |
| JP | A-07-135571 | 5/1995 |
| JP | A-09-027880 | 1/1997 |
| JP | A-09-071365 | 3/1997 |
| JP | A-09-205504 | 8/1997 |
| JP | A-11-084965 | 3/1999 |
| JP | A-2000-118082 | 4/2000 |
| JP | A-2002-103701 | 4/2002 |
| JP | A-2002-196918 | 7/2002 |
| JP | A-2002-321429 | 11/2002 |
| JP | A 2003-186657 | 7/2003 |
| JP | A-2003-319107 | 11/2003 |

* cited by examiner

*Primary Examiner*—Twyler L Haskins
*Assistant Examiner*—Kent Yip
(74) *Attorney, Agent, or Firm*—Oliff & Berridge, PLC (57) ABSTRACT

An image-forming device is configured so that a process to print confidential print data is not automatically resumed after the printing process has been interrupted and the cause of the interruption has been resolved. Accordingly, the printing of confidential print data is not resumed when the user who requested the printing operation is not near the printer during an interruption and another person resolves the cause of the interruption. In this way the image-forming device prevents content of the confidential print data from being exposed to another person.

9 Claims, 6 Drawing Sheets

IMAGE-FORMING DEVICE

BACKGROUND OF THE INVENTION

1. Field of the Invention

The present invention relates to an image-forming device.

2. Description of the Related Art

Printers for performing printing operations based on print data received from a communication terminal are well known in the art. Japanese unexamined patent application publication No. 2003-186657 discloses a printer provided with a "secure print function." The secure print function prohibits a printing process for print data that has been specified as confidential on the communication terminal unless a user enters a prescribed password via a control panel of the printer. This function enhances security when confidential documents or other data that the user does not wish to expose to others are printed.

However, occasionally a printing process for print data specified as confidential can be interrupted by a paper jam or paper out after the prescribed password has been correctly entered and the printing process has begun. Once the problem is resolved and the printing process is still required, conventional printers resume printing the print data as normal data, even when the print data is specified to be confidential. Hence, if the person who resolves the printing problem is not the user that requested the printing operation, for example, the content of the confidential data may be exposed to this person.

SUMMARY OF THE INVENTION

In view of the foregoing, it is an object of the present invention to provide an image-forming device capable of preventing others from viewing the content of confidential data after an image-forming process is interrupted.

The present invention provides an image-forming device having an image-forming unit, an authentication data entering unit, a permission determining unit, a controller, an interruption resolution determining unit, and a re-enter determining unit. The image-forming unit executes an image forming process to form an image on paper. The authentication data entering unit receives authentication data used to authenticate a user. The permission determining unit determines an execution of the image forming process with prescribed data specified as confidential on the basis of the authentication data. The controller controls the image-forming unit to execute the image forming process with the prescribed data when the permission determining unit has determined the execution. The interruption resolution determining unit determines whether an interruption cause has been resolved when the image forming process with the prescribed data is interrupted. The re-enter determining unit determines whether the authentication data has been re-entered via the authentication data entering unit when the interruption resolution determining unit has determined that the interruption cause has been resolved. The controller executes a conditioned resume process for controlling the image-forming unit to resume the image forming process with the prescribed data when the re-enter determining unit has determined that the authentication data has been re-entered and the permission determining unit has determined that the execution is permitted based on the re-entered authentication data.

BRIEF DESCRIPTION OF THE DRAWINGS

The above and other objects, features, and advantages of the invention will become more apparent from reading the following description of the preferred embodiments taken in connection with the accompanying drawings in which.

DESCRIPTION OF THE PREFERRED EMBODIMENTS

Next, a printer according to a first embodiment of the present invention will be described with reference to FIGS. 1 through 3.

Figure 1:
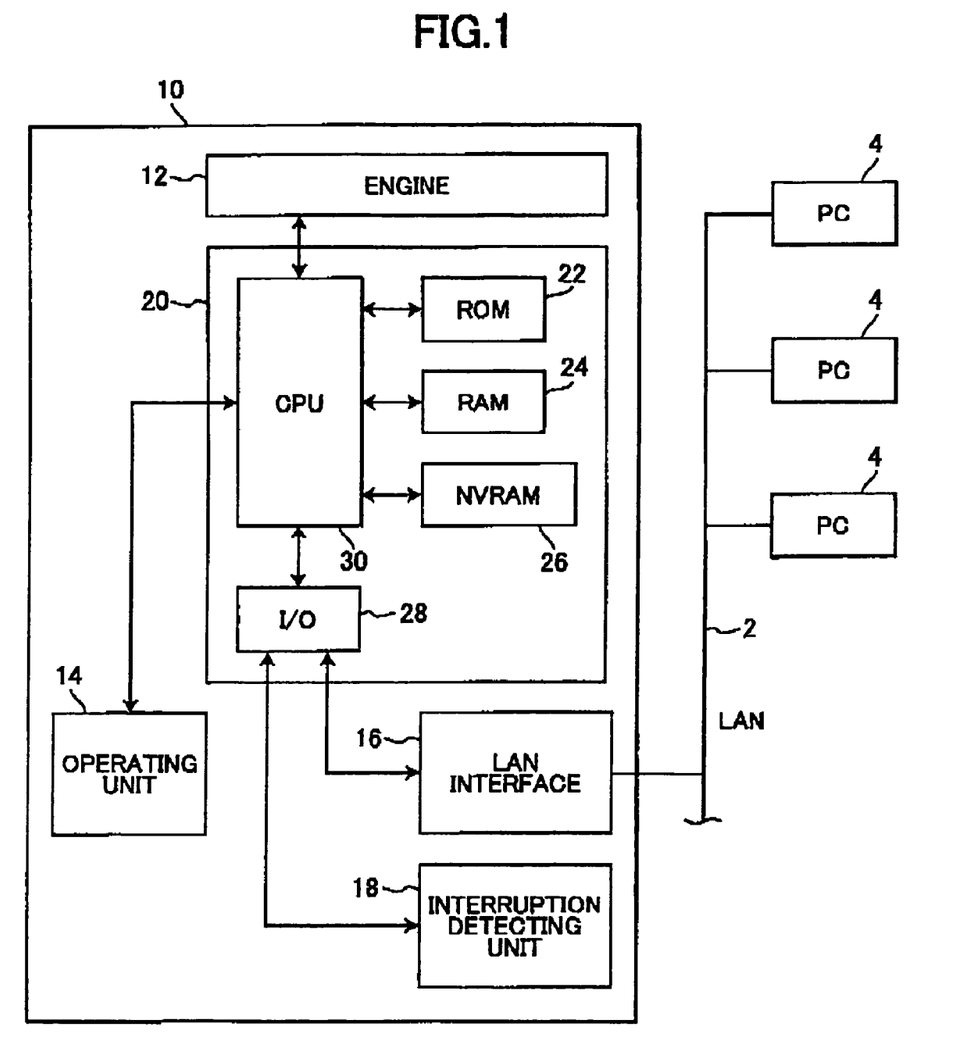
FIG. 1 is a block diagram showing the structure of a printer according to a first embodiment of the present invention.
Figure 2:
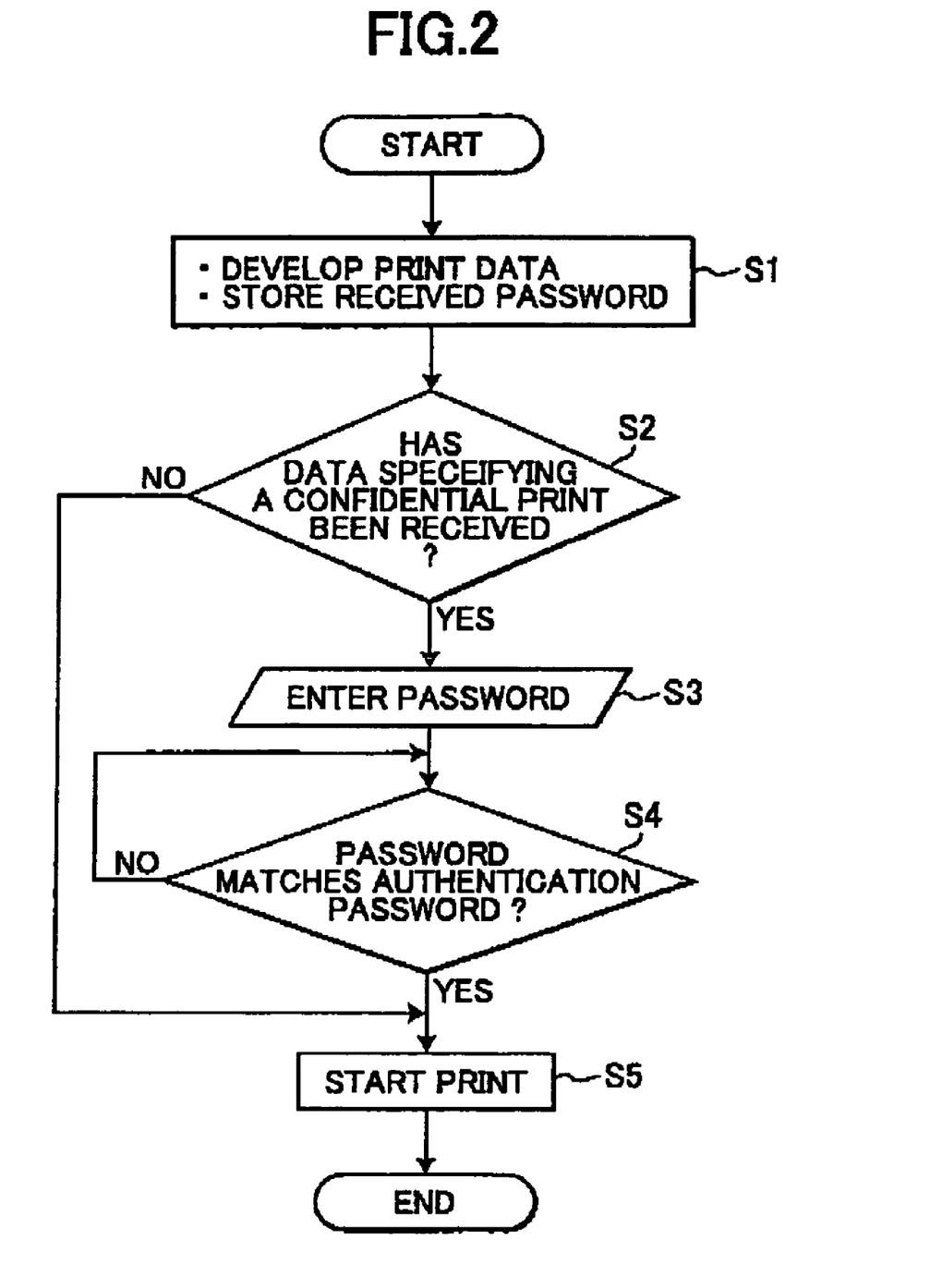
FIG. 2 is a flowchart showing steps in a printing process.

Referring to FIG. 1, the printer 10 includes an engine 12 that performs operations to print on paper: an operating unit 14 having operating keys enabling a user to input data from outside the printer 10 and a display unit for displaying data; a local area network (LAN) interface 16 for transmitting and receiving data via a LAN 2; an interruption detecting unit 18; and a main controller 20 for controlling the aforementioned components. The printer 10 is connected to the LAN 2 through the LAN interface 16.

The main controller 20 includes a RON 22 that stores various computer programs for controlling operations of the printer 10; a CPU 30 that executes operations according to the programs stored in the ROM 22: a RAM 24 for temporarily storing the results of calculations performed by the CPU 30; a non-volatile NVRAM 26; and an I/O port 28 for transferring input and output data. The interruption detecting unit 18 detects interruptions in printing operations described later and identifies the cause of the interruption. The interruption detecting unit 18 sends an output signal indicating that the interruption has occurred to the CPU 30.

A plurality of personal computers 4 are connected to the LAN 2. Therefore, each of the personal computers 4 is connected to the printer 10 through the LAN 2. When a user of one of the personal computers 4 requests a print operation on the personal computer 4 for printing images such as text or graphics displayed on the personal computer 4 by the printer 10, the user is prompted to specify whether or not to perform a confidential print, which is described below.

Specifically, when the user requests a print operation, a settings window is displayed on a monitor screen of the personal computer 4. The settings window includes a checkbox for indicating whether or not to perform a confidential print on the printer 10 and a space for entering a predetermined password such as a user ID. If the checkbox has been checked, indicating that the user wishes to perform a confidential print, then the user must also enter the password. When the request for the print operation has been completed, if the checkbox has been checked and the user ID has been entered, then print data representing the image to be printed (hereinafter referred to as "confidential print data"), the instruction indicating that a confidential print is to be executed, and the entered password are transmitted to the printer 10. If the password is a user ID, and each personal computer 4 is assigned to a specific user so that the user ID for the user of the personal computer 4 can be obtained without the user's entering a user ID, then this user ID may be transferred without requiring the user to enter the user ID.

Further, the operating unit 14 may have a sensor for detecting image data for a human fingerprint or iris.

Next, a printing process performed by the CPU 30 of the printer 10 will be described with reference to the flowchart in FIG. 2. The printing process begins when the printer 10 receives print data via the LAN interface 16.

At the beginning of the printing process in S1, the received print data is developed into a form for printing on the printer 10, and the received password is stored in the non-volatile NVRAM 26, for example. Hereinafter, this password is referred to as the "authentication password." In S2 the CPU 30 determines whether the instruction indicating a confidential print was received along with the print data. Specifically, the CPU 30 determines whether the print data is confidential print data.

Instead of identification data such as passwords, the authentication data may consist of information for identifying the user requesting image formation such as a fingerprint image and iris image. The identification data may be transmitted from an external device such as a terminal via a wired or wireless telephone line to the printer 10.

If the CPU 30 determines that the instruction indicating a confidential print has not been received (S2: NO), then in S5 the CPU 30 controls the engine 12 to begin printing images represented by the print data on paper, and the printing process ends. In the following description, printing images represented by print data will be expressed simply as "printing print data."

However, if the CPU 30 determines that the instruction indicating a confidential print has been received (S2: YES), then in S3 the CPU 30 displays a screen on the display unit of the operating unit 14 prompting the user to enter a password. When a password has been entered, the CPU 30 determines in S4 whether the entered password matches the authentication password stored in the non-volatile NVRAM 26. If the entered password matches the authentication password (S4: YES), then in S5 the CPU 30 begins printing the confidential print data.

Figure 3:
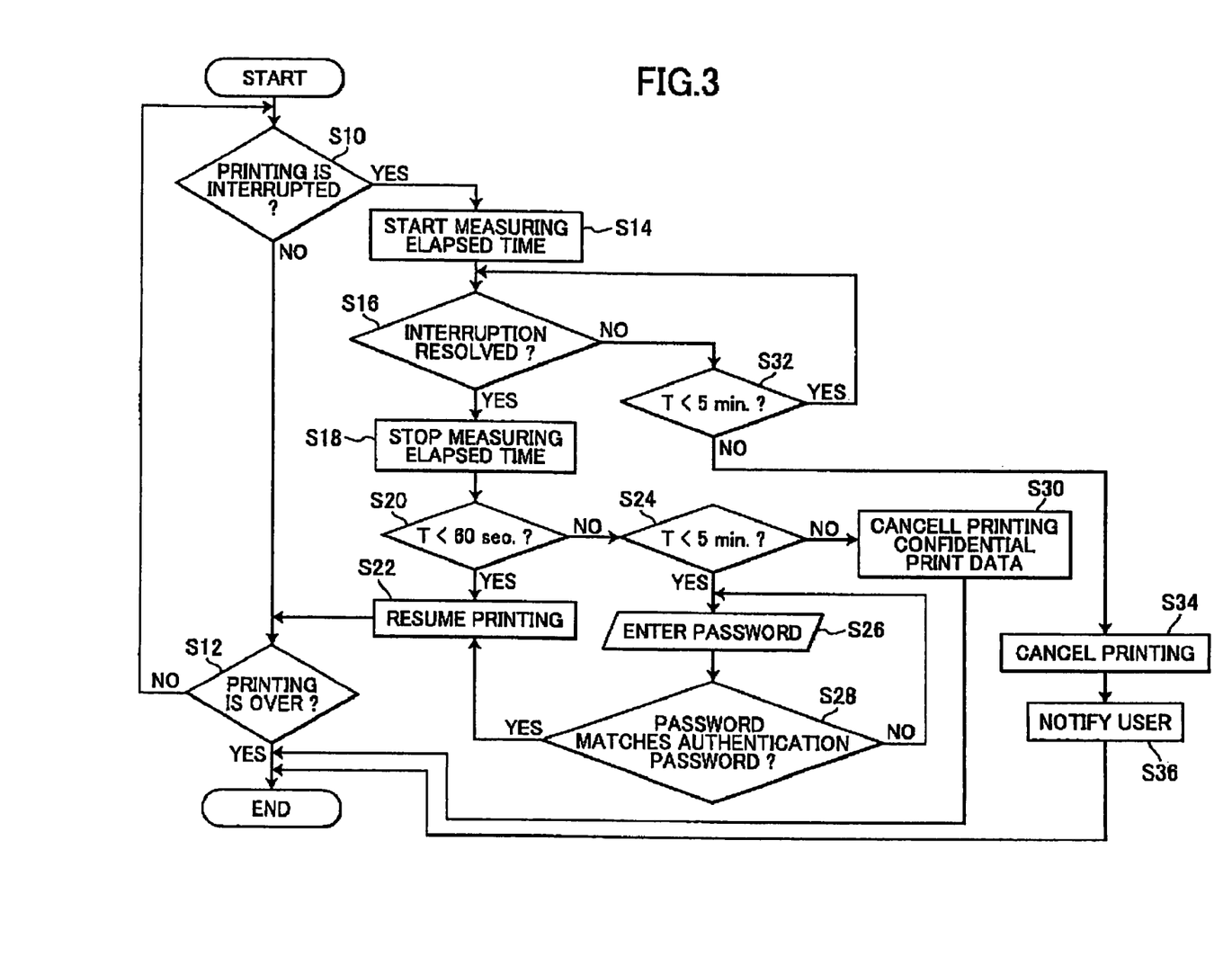
FIG. 3 is a flowchart showing steps in a process performed when a printing operation is interrupted.

FIG. 3 is a flowchart showing steps in a process performed by the CPU 30 when a printing operation for confidential print data is interrupted. In S10 the CPU 30 determines whether the operation to print confidential print data has been interrupted in response to an output signal from the interruption detecting unit 18. If the output signal is not received from the interruption detecting unit 18, this signifies that any interruption has not occurred (S10: NO), and then the CPU 30 continues printing the confidential print data. In S12 the CPU 30 determines whether the printing process for the confidential print data has completed. If an interruption has not occurred by the time the printing process has completed (S12: YES), then the process ends.

However, if the output signal is received from the interruption detecting unit 18 indicating that some kind of accident has happened to interrupt the printing process of the confidential print data (S10: YES), then in S14 the CPU 30 starts measuring the elapsed time from the moment the output signal was received. In S16 the CPU 30 determines whether the output signal from the interruption detecting unit 18 is still being received.

If the output signal from the interruption detecting unit 18 is no longer being received (in other words, if the cause of the interruption has been resolved: S16: YES), then in S18 the CPU 30 stops measuring the elapsed time. In S20 the CPU 30 then determines whether the elapsed time from the moment that the interruption occurred (hereinafter simply referred to as "interruption time T") is less than 60 seconds. If the interruption time T is less than 60 seconds (S20: YES), then in S22 the CPU 30 resumes the printing process for printing the confidential print data. In other words, the CPU 30 executes an "unconditioned resume process" which is not required for the user to enter the password. Hence, when the interruption time T is shorter, then the user who requested printing of the confidential print data is considered to be near the printer 10 and resolve the cause of the interruption. In other words, the user is considered to stand near the printer 10, quickly notice an occurrence of the interruption, and perform some operations necessary for resolving the problem. In such a case, it is proper to execute the unconditioned resume process.

However, if the interruption time T is 60 seconds or greater (S20: NO), then in S24 the CPU 30 determines whether the interruption time T is less than five minutes. If the interruption time T is less than five minutes (S24: YES), then in S26 the CPU 30 displays a screen on the display unit of the operating unit 14 and prompts the user to enter a password.

And in S28 the CPU 30 determines whether the password entered in S26 matches the authentication password stored in the non-volatile NVRAM 26. These steps are equivalent to S3 and S4 of FIG. 2 described above. If the entered password matches the authentication password (S28: YES), then in S22 the CPU 30 resumes printing of the confidential print data. In other words, the CPU 30 executes a "conditioned resume process" which requires the user to enter the password before resuming printing. When the interruption time period T is longer as in this case, the user who requested printing of the confidential print data is not considered to be near the printer 10. Instead, another user is considered to resolve the cause of the interruption. In such a case, it is proper to execute the conditioned resume process.

If the interruption time period T is five minutes or greater (S24: NO), then in S30 the CPU 30 cancels the process for printing the confidential print data, and then shifts the printer 10 into a ready state for printing subsequent print data.

On the other hand, if the interruption detecting unit 18 maintains generating the output signal (in other words, if the cause of the interruption remains; S16: NO), then in S32 the CPU 30 determines whether the interruption time period T is less than five minutes. If the interruption time period T is less than five minutes (S32: YES), then the CPU 30 returns to S16. If the interruption time T is five minutes or greater (S32: NO), then in S34 the CPU 30 cancels the process for printing the confidential print data. And the CPU 30 notifies the user that the interruption cause still remain in the printer 10, for example.

In S30 and S34, the process for printing the confidential print data is cancelled. Accordingly, the confidential print data for printing is deleted from the printer 10. When the interruption time period T is longer, it is preferable that the printer returns to a state capable of printing subsequent print data. When the interruption has not resolved, the CPU 30 display a message to notify the user that the printer 10 is not available for printing, for example.

In the preferred embodiment described above, a printing process for printing confidential print data is not automatically resumed after being interrupted. When the cause of the interruption has been resolved and a password matching the authentication password is re-entered, the printing process for printing confidential print data is resumed. Accordingly, when the user who requested printing of the confidential print data is not near the printer 10 and another user resolves the cause of the interruption, the printer 10 does not resume the printing process, because the password entered by the user resolving the interruption is not matched with the authentication password. Therefore, the content of the confidential print data is prevented from being exposed to other person.

Further, the printer 10 executes one of an unconditioned resume process or a conditioned resume process depending on the length of the interruption time period T. When the interruption time period T is shorter, the user requesting the printing process is considered to stay near the printer 10 and resolve the interruption cause. Therefore, the printing process can be resumed without requiring the user to re-enter the password. On the other hand, when the interruption time period T is longer, it is considered that the user requesting the printing process does not stay near the printer 10 and another user may resolve the interruption cause. Therefore, in order to identify the user, the printer 10 requests the user to enter the password. Thus, the conditioned resume process is necessary and proper.

Next, a process according to a second embodiment of the present invention performed by the CPU 30 when an operation to print confidential data is interrupted will be described with reference to the flowchart in FIG. 4. In the second embodiment, conditions for determining whether to execute a conditioned resume process or an unconditioned resume process are different from those of the first embodiment. In other words, the process after the interruption is resolved is determined depending on a type of the cause of the printing operation being interrupted.

The following is a list of sample causes for a printing operation being interrupted.

(1) Group 1: G1 (interruption causes that are considered to be resolved in a shorter time period because the user is considered to be in the proximity of the printer 10 and resolve the interruption cause)

a. A cover provided on the body of the printer 10 remains open after a toner cartridge is replaced b. A paper jam has occurred c. A paper cassette that is loadable in the printer 10 has not been properly loaded d. Printed paper exceeding a prescribed amount has accumulated on the discharge tray of the printer 10

(2) Group 2: G2 (interruption causes that forces the user to temporarily leave the printer 10 in order to resolve the cause, such as replacing a consumable product)

a. The paper cassette is out of paper b. The toner cartridge is out of toner and must be replaced c. The required paper size is not loaded in a paper cassette d. A user-directed interruption. In the preferred embodiment, the user can forcibly interrupt and restart an operation to print confidential print data by performing prescribed operations on the operating unit 14. The cause of a user-directed interruption is also detected by the interruption detecting unit 18, which provides the corresponding output signal to the CPU 30.

(3) Group 3 (a serious interruption that requires a qualified repairperson to resolve)

In the second embodiment, interruption causes belonging to Group 1 and Group 2 described above are sorted by group, and stored in the non-volatile NVRAM 26, for example, as group classification data. When an interruption occurs due to a problem in the printer 10, the interruption detecting unit 18 detects and identifies the type of interruption cause and provides an output signal corresponding to the type of the interruption cause to the CPU 30.

It should be noted that the classification of interruption depends on requirements for the conditioned resume process and the unconditioned resume process. In this embodiment, the criteria of the classification is whether the user who requested image formation of confidential print data has to move away from the printer 10 in order to resolve the interruption cause.

Figure 4:
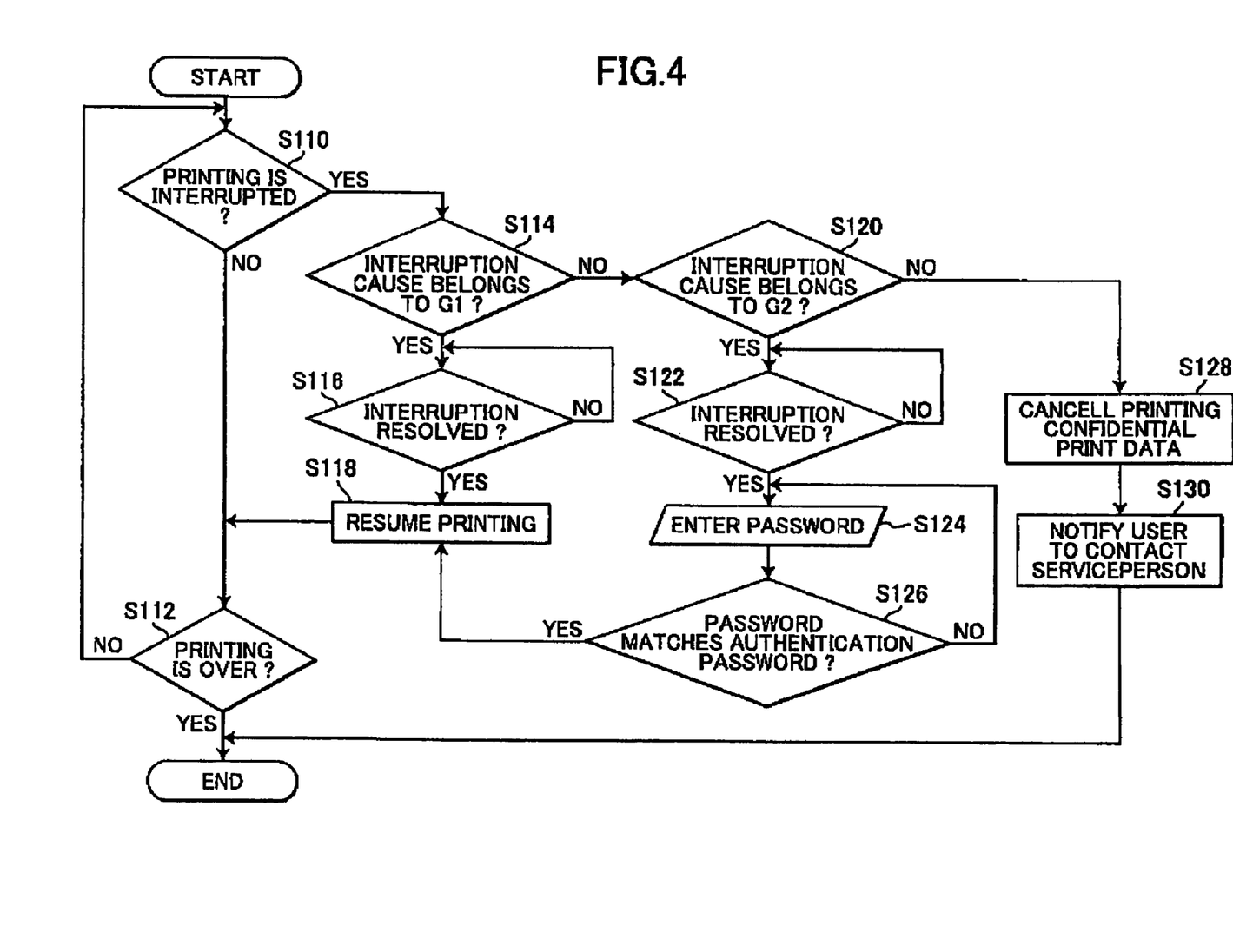
FIG. 4 is a flowchart showing steps in a process according to a second embodiment performed when a printing operation is interrupted.

FIG. 4 is a flowchart showing steps in a process performed by the CPU 30 when an operation to print confidential print data is interrupted. In S110 the CPU 30 determines whether an operation to print confidential print data has been interrupted in response to an output signal from the interruption detecting unit 18. If the output signal is not received from the interruption detecting unit 18, this signifies that any interruption has not occurred (S110: NO), and then the CPU 30 continues printing the confidential print data. In S112 the CPU 30 determines whether the printing process for the confidential print data has completed. If an interruption has not occurred till the time the printing process has completed (S112: YES), then the process ends.

On the other hand, in S110 if something has occurred that causes the interruption of a printing operation for printing confidential print data and the CPU 30 has received an output signal from the interruption detecting unit 18 (S110: YES), then in S114 and S120 the CPU 30 determines which the interruption cause belongs to Group 1 or Group 2 based on the output signal by referencing the group classification data stored in the non-volatile NVRAM 26.

If the CPU 30 determines that the cause belongs to Group 1 (S114: YES), then in S116 the CPU 30 determines whether the output signal from the interruption detecting unit 18 is still being received. If the output signal from the interruption detecting unit 18 is no longer being received (S116: YES), then in S118 the CPU 30 resumes the printing process of the confidential print data as soon as the cause of the interruption has been resolved. In other words, the CPU 30 executes an unconditioned resume process. As described above, Group 1 includes minor interruption causes that can be resolved at the printer 10. Hence, the user who requested the printing of confidential print data is considered to have resolved the problem while remaining next to the printer 10. In such a case the unconditioned resume process can be executed.

However, if the CPU 30 determines that the interruption cause does not belong to Group 1 (S114: NO), then in S120 the CPU 30 determines whether the interruption cause belongs to Group 2. If the CPU 30 determines that the interruption cause belongs to Group 2 (S120: YES), then in S122 the CPU 30 determines whether the output signal from the interruption detecting unit 18 is still being received. If the output signal from the interruption detecting unit 18 is no longer being received (S122: YES), then in S124 the CPU 30 prompts the user to enter a password. Then, in S126 the CPU 30 determines whether the entered password matches the authentication password. In S126, if the entered password matches the authentication password (S126; YES), the CPU 30 then executes a conditioned resume process to resume printing the confidential print data. As described above, Group 2 includes interruption causes that forces the user to temporarily leave the printer 10 in order to resolve the interruption. In such a case, the user who requested the printing of confidential print data is considered not to be near the printer 10. Hence, it is required to execute the conditioned resume process.

If the CPU 30 determines that the interruption cause does not belong to either Group 1 or Group 2 (S120: NO), then in S128 the CPU 30 cancels the printing operation and advances into a ready state to print subsequent print data. In addition, in S130 the CPU 30 displays a message on the display unit of the operating unit 14 indicating that a contact to a service repairperson is required, for example.

In the embodiment described above, the printer 10 is configured to execute the unconditioned resume process or the conditioned resume process depending on the type of interruption cause. When the interruption cause is minor and can be resolved at the printer 10 (Group 1), then the user who requested the printing operation is considered to be near the printer 10 and resolve the interruption. Accordingly, the printing process can be resumed without prompting the user to re-enter the password. However, in the case of a non-minor interruption cause that usually forces the user to retrieve a consumable product from another location (Group 2), the conditioned resume process is executed since the user is not considered to be near the printer 10 and another user is considered to resolve the interruption.

The printing of the confidential print data with the printer 10 of the preferred embodiment can be forcibly interrupted by performing prescribed operations on the operating unit 14. Hence, in case that the user that requests the printing of confidential print data must suddenly leave the printer 10, the printer 10 can stop the printing process after the user leaves.

The process according to the third embodiment performed during an interruption of the printing of confidential data may be configured of both the process in FIG. 3 (first embodiment) based on the interruption time and the process of FIG. 4 (second embodiment) based on the type of interruption cause. The CPU 30 executes a conditioned resume process when the CPU 30 determines in the process of FIG. 3 an execution of a conditioned resume process, even if the CPU 30 determines in the process of FIG. 4 to execute an unconditioned resume process.

Figure 5A:
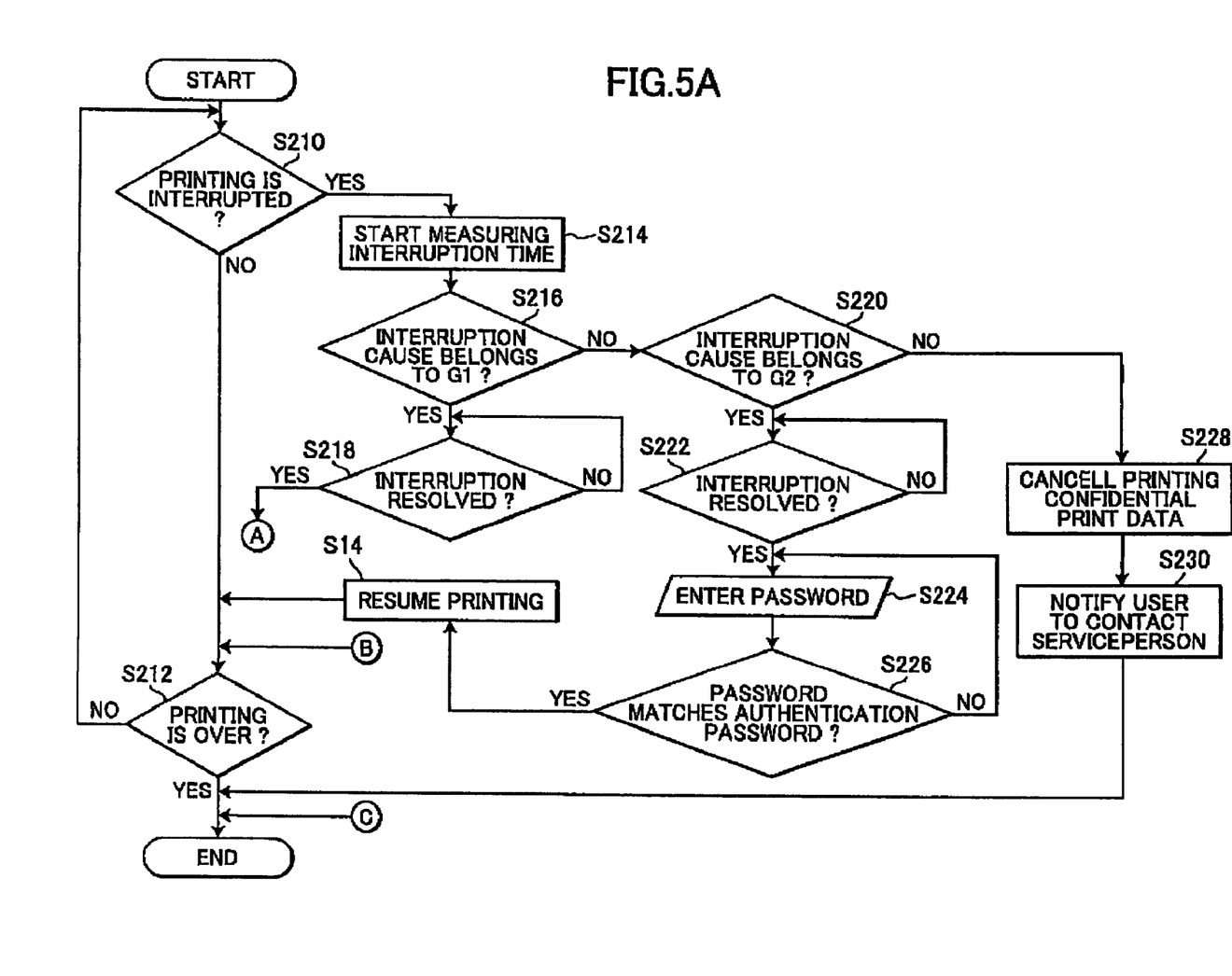
FIGS. 5A and 5B are flowcharts showing steps in a process according to a third embodiment performed when a printing operation is interrupted.
Figure 5B:
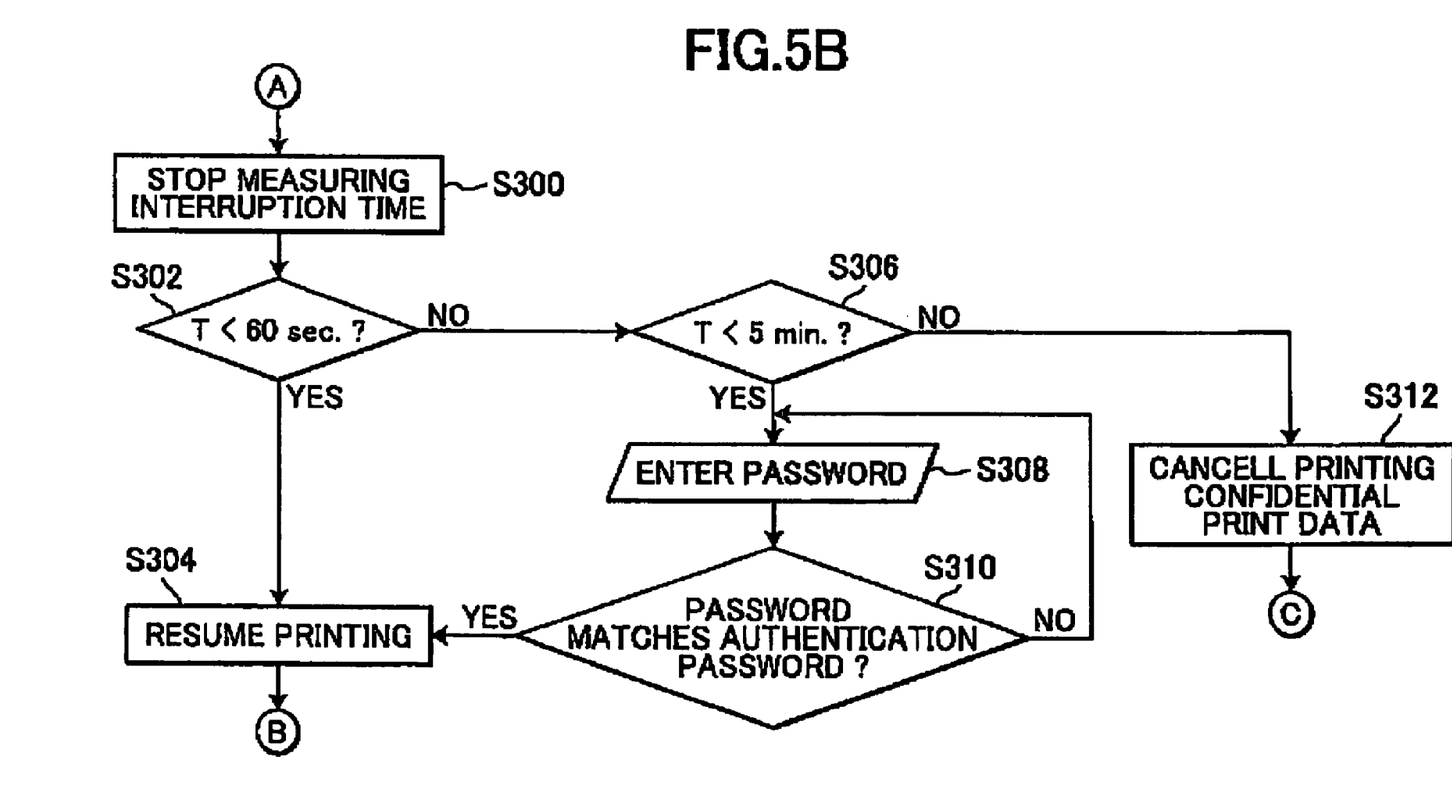

FIGS. 5A and 5B show flowcharts showing steps in the process according to the third embodiment. In S210 the CPU 30 determines whether an operation to print confidential print data has been interrupted in response to an output signal from the interruption detecting unit 18. If the output signal is not received from the interruption detecting unit 18, this signifies that any interruption has not occurred (S210: NO), and then the CPU 30 continues printing the confidential print data. In S212 the CPU 30 determines whether the printing process for the confidential print data has completed. If an interruption has not occurred till the time the printing process has completed (S212: YES), then the process ends.

However, if an output signal is received from the interruption detecting unit 18 indicating that some kind of accident has happened to interrupt the printing process of the confidential print data (S210: YES), then in S214 the CPU 30 starts measuring an interruption time T. Then in S216 the CPU 30 determines which the interruption cause belongs to Group 1 or Group 2 based on the output signal by referencing the group classification data stored in the non-volatile NVRAM 26.

If the CPU 30 determines that the cause belongs to Group 1 (S216: YES), then in S218 the CPU 30 determines whether the output signal from the interruption detecting unit 18 is still being received. If the output signal from the interruption detecting unit 18 is no longer being received (S218: YES), then the CPU 30 advances to the process shown in FIG. 5B.

Referring to FIG. 5B, in S300 the CPU 30 stops measuring the interruption time T. In S302 the CPU 30 then determines whether the interruption time T is less than 60 seconds. If the interruption time T is less than 60 seconds (S302: YES), then in S304 the CPU 30 resumes the printing process for printing the confidential print data. In other words, the CPU 30 executes an "unconditioned resume process" which is not required for the user to enter the password. In such a case, it is proper to execute the unconditioned resume process.

On the other hand, if the interruption time T is 60 seconds or greater (S302: NO), then in S306 the CPU 30 determines whether the interruption time T is less than five minutes. If the interruption time T is less than five minutes (S306: YES), then in S308 the CPU 30 displays a screen on the display unit of the operating unit 14 and then prompts the user to enter a password.

And in S310 the CPU 30 determines whether the password entered in S308 matches the authentication password stored in the non-volatile NVRAM 26. If the entered password matches the authentication password (S310; YES), then in S304 the CPU 30 resumes printing of the confidential print data. In other words, the CPU 30 executes a "conditioned resume process" which requires the user to enter the password before resuming printing.

As described above, the first determination based on the classification of the interruption causes allows the printer 10 to execute the unconditioned resume process. However, the second determination based on the length of the interruption time T requires the printer 10 to execute the conditioned resume process which instructs the user to enter password. When the result of the second determination is different from that of the first determination, the CPU 30 is configured to select the conditioned resume process.

As described above, when the interruption time T is longer, the CPU 30 selects the conditioned resume process in spite of that the interruption cause is minor. This is because when the interruption time period is longer, the user who requested printing of the confidential print data is not considered to be near the printer 10. Instead, another user is considered to resolve the cause of the interruption. In such a case, it is proper to execute the conditioned resume process.

When the interruption time period T is five minutes or greater (S306: NO), any password has not been entered within a prescribed time period after prompting the user to enter the password, or the entered password does not match the authentication password, in S312 the CPU 30 cancels the process for printing the confidential print data, and then displays the message indicating that a contact to a serviceperson is necessary. As described above, under the conditioned resume process, the password is not sometime entered after a prescribed time has elapsed. If this situation remains for a certain time period, image formation of subsequent data cannot be performed. Accordingly, the printer 10 is configured to cancel image formation of the confidential print data.

Referring to FIG. 5A again, if the CPU 30 determines that the interruption cause does not belong to Group 1 (S216: NO), then in S220 the CPU 30 determines whether the interruption cause belongs to Group 2. If the CPU 30 determines that the interruption cause belongs to Group 2 (S220: YES), then in S222 the CPU 30 determines whether the output signal from the interruption detecting unit 18 is still being received. If the output signal from the interruption detecting unit 18 is no longer being received (S222: YES), then in S224 the CPU 30 prompts the user to enter a password. Then, in S226 the CPU 30 determines whether the entered password matches the authentication password. In S226, if the entered password matches the authentication password (S226: YES), the CPU 30 then executes a conditioned resume process to resume printing the confidential print data.

If the CPU 30 determines that the interruption cause does not belong to either Group 1 or Group 2 (S220: NO), then in S228 the CPU 30 cancels the printing operation. In addition, in S230 the CPU 30 displays a message on the display unit of the operating unit 14 indicating that a contact with a service repairperson is required, for example.

Accordingly, the above configuration can handle such cases as when the interruption cause is an error in paper size and the user who requested printing of the confidential print data wishes to re-execute the printing process after replacing the paper with the prescribed size or wishes to forcibly re-execute the printing process on the current paper size.

Further, in the embodiments described above, the printer 10 may be configured to allow a user to cancel a request to print confidential print data through the operating unit 14 and to advance to a ready state when a printing request has been cancelled. Alternatively, it is possible that an external device such as a terminal sends an interruption command to cancel the request via a wired or wireless telephone line. With this configuration, a user other than the user who requested printing of confidential print data can cancel the printing request in order to forcibly allow the current user's data to be printed, even if a password has not been entered in the conditioned resume process.

In the above case, the user can cancel the request to print confidential print data. However, this request is one of the interruption causes to interrupt the printing operation, which belongs to the Group 2. Therefore, the printer 10 can execute the conditioned resume process when this interruption cause has resolved.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. An image-forming device comprising:
    an image-forming unit that executes an image forming process to form an image on paper;
    an authentication data entering unit that receives authentication data used to authenticate a user;
    a permission determining unit that determines an execution of the image forming process with prescribed data specified as confidential on the basis of the authentication data;
    a controller that controls the image-forming unit to execute the image forming process with the prescribed data when the permission determining unit has determined the execution;
    an interruption resolution determining unit that determines whether an interruption cause has been resolved when the image forming process with the prescribed data is interrupted;
    a re-enter determining unit that determines whether the authentication data has been re-entered via the authentication data entering unit when the interruption resolution determining unit has determined that the interruption cause has been resolved;
    a timer that measures an elapsed time period from an interruption of the image forming process to a resolution of the interruption cause; and
    an identification unit that identifies a type of the interruption cause,
    wherein the controller executes a conditioned resume process for requiring a re-entry of the authentication data to the authentication data entering unit and then resuming the image forming process with the prescribed data, when the identified interruption cause is a first type,
    the controller further comprises a first determining unit that determines whether the elapsed time period has reached a predetermined time period, when the identified interruption cause is a second type different from the first type,
    the controller executes an unconditional resume process for resuming the image forming process with the prescribed data without requiring the re-entry of the authentication data, when the elapsed time period is less than the predetermined time period, and
    the controller executes the conditioned resume process, when the elapsed time period is more than or equal to the predetermined time period.

2. The image-forming device according to claim 1, wherein the controller includes:
    a second determining unit that determines, based on the type of interruption cause, an execution of one of the conditioned resume process and the unconditioned resume process, and
    the controller executes the conditioned resume process when the first determining unit determines that the elapsed time period has reached the predetermined time period and the second determining unit determines that the conditioned resume process should be executed.

3. The image-forming device according to claim 1, further comprising:
    a memory that stores a first interruption cause that can be resolved by a user requesting image forming process with the prescribed data and maintaining staying beside the image-forming device, and a second interruption cause that includes another cause other than the first interruption cause; and
    a third determining unit that determines which the interruption cause belongs to the first interruption cause or the second interruption cause;
    wherein the controller executes the unconditioned resume process when the determining unit determines that the interruption cause belongs to the first interruption cause, and executes the conditioned resume process when the determining unit determines that the interruption belongs to the second interruption cause.

4. The image-forming device according to claim 1, further comprising:
    a memory that stores a first interruption cause which is resolved by supplying a consumable product to the image-forming device, and a second interruption cause that includes another cause other than the first interruption cause; and
    a third determining unit that determines which the interruption cause belongs to the first interruption cause or the second interruption cause;
    wherein the controller executes the unconditioned resume process when the third determining unit determines that the interruption cause belongs to the second interruption cause, and executes the conditioned resume process when the third determining unit determines that the interruption cause belongs to the first interruption causes.

5. The image-forming device according to claim 1, further comprising:
    an interruption instructing unit that receives an interruption command for canceling the image forming process;
    wherein the image-forming unit cancels the image forming process with the prescribed data when the interruption command is entered via the interruption instructing unit.

6. The image-forming device according to claim 5, the controller further comprising:
    a release command entering unit that enters a release command for releasing an interruption caused by enter of the interruption command; and a release command determining unit that determines whether the release command has been entered via the release command entering unit;

wherein the controller executes the conditioned resume process when the release command determining unit determines that release command has been entered.

7. The image-forming device according to claim 1, wherein:

the timer measures a standby time period in the conditioned resume process until the authentication data has been entered via the authentication data receiving unit, and the controller includes:

a standby time determining unit that determines whether the standby time period has exceeded a prescribed time; and a first shifting unit that shifts to a state capable of performing an image forming process with subsequent data other than the prescribed data when the standby time determining unit determines that the standby time has exceeded the prescribed time.

8. The image-forming device according to claim 1, further comprising:

a cancel command entering unit that receives a cancel command used to cancel the image forming process with the prescribed data;

a cancel command determining unit that determines whether the cancel command has been entered via the cancel command entering unit; and a second shifting unit that shifts to a state capable of performing an image forming process with subsequent data other than the prescribed data when the cancel command determining unit determines that the cancel command has been entered.

9. The image-forming device according to claim 1, wherein the authentication data is a password.

* * * * *